(12) United States Patent
Xia et al.

(10) Patent No.: US 12,111,516 B2
(45) Date of Patent: Oct. 8, 2024

(54) SPECTACLE LENS AND FRAME GLASSES

(71) Applicant: SHANGHAI ISPARX MEDICAL CO., LTD, Shanghai (CN)

(72) Inventors: Risheng Xia, Wen Zhou (CN); Yiyu Li, Wen Zhou (CN); Hao Chen, Wen Zhou (CN); Jia Qu, Wen Zhou (CN)

(73) Assignee: SHANGHAI ISPARX MEDICAL CO., LTD, Shanghai (CN)

( * ) Notice: Subject to any disclaimer, the term of this patent is extended or adjusted under 35 U.S.C. 154(b) by 0 days.

(21) Appl. No.: 18/563,431

(22) PCT Filed: Jan. 19, 2022

(86) PCT No.: PCT/CN2022/072734
§ 371 (c)(1),
(2) Date: Nov. 22, 2023

(87) PCT Pub. No.: WO2023/065556
PCT Pub. Date: Apr. 27, 2023

(65) Prior Publication Data
US 2024/0264465 A1 Aug. 8, 2024

(30) Foreign Application Priority Data
Oct. 22, 2021 (CN) .......................... 202111230721.8

(51) Int. Cl.
*G02C 7/02* (2006.01)
(52) U.S. Cl.
CPC ............. *G02C 7/022* (2013.01); *G02C 7/028* (2013.01); *G02C 2202/24* (2013.01)
(58) Field of Classification Search
CPC ..... G02C 7/022; G02C 7/028; G02C 2202/24
(Continued)

(56) References Cited

U.S. PATENT DOCUMENTS

| 6,325,510 | B1 | 12/2001 | Golub et al. |
| 11,397,335 | B2* | 7/2022 | To .......................... G02C 7/022 |
| 2016/0306192 | A1 | 10/2016 | Marshall et al. |
| 2020/0159044 | A1* | 5/2020 | To .......................... G02C 7/022 |
| 2021/0048690 | A1 | 2/2021 | Guillot et al. |
| 2022/0057293 | A1* | 2/2022 | Qi ...................... G01M 11/0228 |

(Continued)

FOREIGN PATENT DOCUMENTS

| CA | 2981888 A1 | 10/2016 |
| CN | 104678572 A | 6/2015 |

(Continued)

OTHER PUBLICATIONS

Chinese Notice of Allowance dated Nov. 1, 2022, for Application No. 202210676471.9, 2 pages.
(Continued)

*Primary Examiner* — William R Alexander
(74) *Attorney, Agent, or Firm* — FROST BROWN TODD LLP

(57) ABSTRACT

An optical zone forms a base surface of a spectacle lens and has a refractive power per a prescription. A functional zone surrounds a central optical zone of the spectacle lens and includes a plurality of functional sub-elements fitting with one another. Each of the functional sub-elements includes a first lens located in a central position and a plurality of second lenses around the first lens. Each of the second lenses has a surface shape of a regular polygon. The second lenses are in surface contact with one another via a surface where sides of the regular polygons are located. Wavefronts formed by the functional sub-elements can be superimposed on a working focal plane of the optical zone to form a uniform difussion circle that can form a blurred peripheral vision image. The spectacle lens can perform deep modulation for the imaging quality of the image plane on the retina.

18 Claims, 2 Drawing Sheets

(58) Field of Classification Search
USPC .................................................. 351/159.01
See application file for complete search history.

(56) References Cited

U.S. PATENT DOCUMENTS

| | | | | |
|---|---|---|---|---|
| 2023/0083468 A1* | 3/2023 | Qi | ............ | G02C 7/022 |
| | | | | 351/159.42 |
| 2023/0109270 A1* | 4/2023 | Giraudet | ............ | G02C 7/04 |
| | | | | 351/159.41 |
| 2023/0161177 A1* | 5/2023 | Varnas | ............ | G02C 7/066 |
| | | | | 351/159.42 |

FOREIGN PATENT DOCUMENTS

| | | | |
|---|---|---|---|
| CN | 104749791 | A | 7/2015 |
| CN | 106291976 | A | 1/2017 |
| CN | 107708614 | A | 2/2018 |
| CN | 111694165 | A | 9/2020 |
| CN | 112526768 | A | 3/2021 |
| CN | 113376866 | A | 9/2021 |
| CN | 113900275 | A | 1/2022 |
| CN | 114994951 | B | 12/2022 |
| EP | 0445994 | A2 | 9/1991 |
| EP | 3561578 | A1 | 10/2019 |
| TW | 202136865 | A | 10/2021 |
| WO | WO 2020/261213 | A1 | 12/2020 |

OTHER PUBLICATIONS

International Search Report and Written Opinion date Jul. 27, 2022, for International Application No. PCT/CN2022/072734, 7 pages.

\* cited by examiner

SPECTACLE LENS AND FRAME GLASSES

TECHNICAL FIELD

The present disclosure relates to the field of ophthalmic devices, and specifically to a spectacle lenses to be worn in front of human eyes, so as to inhibit development of abnormalities of eyes, such as myopia or hyperopia.

BACKGROUND

Conventional lenses are primarily directed towards correction of vision in eyes having ametropias. This type of lenses is used as a relief for the imperfections in eyes. As people wear the type of lenses (e.g. single-vision lenses), vision will inevitably deteriorate (e.g. myopia progression). More desirably, people expect to actively control ametropias (e.g. myopia, hyperopia and the like) to prevent further deterioration of vision. Therefore, on the basis of the conventional single-vision lenses, new functional lenses with a function of slowing down the myopia progression have been developed.

An example of the early functional lenses for slowing down and inhibiting myopia progression is a peripheral continuous defocus lens where the refractive power of the periphery of the spherical lens is higher than the central area thereof, such as a rotationally symmetrical ring defocus lens where the refractive power of the spherical lens is gradually increase along each radial direction, a non-rotationally symmetric defocus lens where the refractive power of the spherical lens changes gradually in different incremental fashion along four directions orthogonal to one another, a progressive multifocal lens where the refractive power of the spherical lens increases vertically from the upper part to the lower part of the spectacle lens, and the like. In the type of lenses, the continuous change of the surface curvature is the main reason for the increment of the refractive power of the spherical lens. However, according to the basic principle of differential geometry, the continuous change of the curvature of the surface shape of the lens must be accompanied with the difference in principal curvature of the surface, and the difference in principal curvature mainly embodies the astigmatism distribution of the curved surface. Therefore, the incrementing refractive power of the spherical lens leads to synchronous occurrence of astigmatism and aberration, further resulting in a deterioration in imaging quality of the lens.

For the peripheral continuous defocus lens, when a user wears the type of lenses, if an object is eyed from the out-of-focus area where the refractive power of the peripheral spherical lens increases, the visual effect is much blurred, as compared to that achieved from the central optical zone of the lens. If an object is eyed from the central optical zone, the peripheral vision blurring effect can also be achieved due to the passage through the peripheral out-of-focus area. The peripheral vision blurring mechanism is considered as having a close association with the myopia progression control. However, the obvious defect of the peripheral continuous defocus lens is that the change distribution of the refractive power of the spherical lens must result in continuous changes in visual magnification. Therefore, there will be visual distortion and deformation in the full field of view; causing the wearer to feel uncomfortable.

A new type of functional lenses for slowing down and inhibiting myopia progression is mainly of a peripheral discrete multi-point defocus design, where a series of microlenses are scatteredly arranged around the spectacle lens in a certain pattern, and a second refractive zone is formed using the positive addition of the microlenses, for example, the contents disclosed by CN104678572A. When the spectacle lens is imaging, the first refractive zone without microlens distribution has a regular function of focusing the image on the retina of the eye, and meanwhile, the second refractive zone plays the role of focusing the image in front of the retina of the eye, so as to inhibit the myopia progression. In order to simultaneously implement imaging on and in front of the retina, microlenses have to be separated by a certain distance, and the reserved separation area serves as the first refractive zone: therefore, the area filling rate of the microlenses in the microstructure area is generally not allowed to exceed 60% so that the spectacle lens can be effective. It is because of the limited filing rate of the microlenses that the peripheral discrete multi-point defocus lens cannot perform deep modulation for the imaging quality of the image plane on the retina. In the meantime, in the case of using the peripheral discrete lens, images are present on the retina and in front of the retina (double images), which may easily cause eye accommodation disorders.

As a result, there arises a need for a spectacle lens that can help patients with ametropias to have clear vision, and inhibit further deterioration of vision.

SUMMARY

In view of the current situation of the spectacle lens according to the prior art as mentioned above, one of the objectives of the present disclosure is to provide a spectacle lens capable of inhibiting the progression of the ametropia while ensuring sufficient visibility and good experience in wearing.

The above-mentioned objective can be implemented by the spectacle lens in the form described below: The spectacle lens comprises an optical zone and a functional zone. The optical zone can play a corrective role for vision of a patient with an ametropia. The optical zone forms a base surface of the spectacle lens and has a refractive power according to an eyeball prescription, and the optical zone comprises a central optical zone located in a central area of the spectacle lens. The functional zone surrounds a central optical zone and includes a plurality of functional sub-elements fitting with one another. Each of the functional sub-elements includes a first lens located in a central position and a plurality of second lenses around the first lens. The first lens and the second lenses have different refractive powers. Each of the second lenses has a surface shape of a regular polygon, the respective second lenses of at least a part of the plurality of functional sub-elements are in surface contact with one another via a surface where sides of the regular polygons are located, and the plurality of functional sub-elements are configured such that wavefronts formed thereby can be superimposed on a working focal plane of the optical zone to form a uniform diffusion circle that can form a blurred peripheral vision image.

When an object is eyed ahead or via other lens area provided with an optical zone, the optical zone designed according to the eyeball prescription can guarantee the clear vision of the eye. Meanwhile, the second lenses through the functional zone can form burred peripheral images in front of and/or behind the retina, thereby preventing the eyeball from being stimulated and ensuring that the eye axis does not change, and the vision does not deteriorate. Since the respective functional sub-elements within the functional zone are arranged in the fashion of fitting with one another, and the respective second lenses within the respective functional sub-elements are arranged in the fashion of fitting with one another, the functional zone for modulation has a great filling rate. In the circumstance, the functional zone can perform deep modulation for the imaging quality of the image plane on the retina, to form a blurred image and avoid double images.

Preferably, the refractive power P1 of the first lens and the refractive power P0 of the optical zone of the respective area are set to meet: P1=P0+ADD, where ADD is an additional refractive power that may be any value from the range of 0 to 0.3D. As the second lenses at the outer periphery of the functional sub-element each have a regular-polygonal surface shape and the respective functional sub-elements fit with one other via the second lenses, the first lenses surrounded by the second lenses are present in a regular-polygonal surface shape and are arranged on the spectacle lens in a regular pattern in the circumferential direction. When the refractive power of each first lens of the functional element is set to be substantially equal to 0.3 the refractive power of the optical zone in the corresponding position, the first lens has a function equivalent to that of the optical zone. When looking in any direction, the wearer can capture a clear image.

Preferably, at least a part of the first lenses in the plurality of functional sub-elements are in contact with all the second lenses in the functional sub-elements. For this type of spectacle lens, the second lenses may be processed preferentially, and when the processing is performed to the position of the first lens, it only needs to process the surface of the first lens to a corresponding shape capable of forming the refractive power as required, without processing the respective surfaces of the first lens facing the respective second lenses. Even when the additional refractive power of the first lens is 0, the worker only needs to process the second lens. Obviously, this is beneficial to improve the processing speed and the processing quality:

Preferably, the second lens is a regular lens, and the normal direction of the second lens at its center is generally the same as the normal direction of the base surface in this position. Although the sub-wavefronts of the second lenses are not confocal with one another, center light of the sub-wavefronts corresponding to the second lenses in the form is all directed towards the same image point position formed by the base curved surface on the retina, ensuring that sub-wavefronts can form a stack at the image point when the light is propagated to the retina, and the ideal image point is spread into a diffusion circle, thus significantly degrading the imaging quality. This achieves an optimal blur imaging effect.

Preferably, the apexes of the second lens are formed on the base surface. More preferably, the second lens is a convex or concave lens disposed on an object side surface of the spectacle lens away from the eyeball, and there is a distance between the six edges of the top surface of the second lens and the base surface. On one hand, the setting that the apex of the second lens is set on the base surface ensures that the second lens does not protrude from or be recessed into the base surface in a deep distance, to allow the thickness of the spectacle lens to be in a stable range. For the second lens protruding from the base surface, the lens does not have a great thickness even in the presence of the second lens, so it has the characteristics of being light and thin. For the second lens recessed into the base surface, the small recess depth thereof does not deteriorate the anti-bending and anti-torsion performance at the location of the spectacle lens corresponding to the second lens. On the other hand, the setting that the apexes of the second lens are set on the base surface ensures that a stable reference base may be provided throughout the lens processing process, thus reducing the lens processing complexity. In addition, there is a distance between the six edges of the top surface of the second lens and the base surface. This can ensure that the second lens has a good reshaping and reproduction effect in the subsequent lens hardening and coating process, and avoids the interference of the smoothing effect of the film to the stability of the additional refractive power of the second lens. It would be appreciated that the film here is formed of a material with high hardness to improve the wear resistance of the spectacle lens, where its hardness is greater than that of the base material of the spectacle lens.

Preferably, at least 80% of the second lenses have the same shape surface and refractive power such that wavefronts generated by the part of the second lenses have the same phase advance or phase lag relative to wavefronts generated by the first lenses. In the case, those second lenses can enable the phase-modulated wavefronts to form a diffusion circle with a certain size and uniform energy distribution on the retina, rather than a clear point image.

Preferably, the surface shape of the second lens is any one selected from an equilateral triangle, a square and a regular hexagon Preferably, the central optical zone has a surface shape substantially of a circle, and the circle has a radius r within a range from 3 mm to 10 mm.

Preferably, the first lens and the second lens have the same regular hexagon surface shape, and the functional sub-element includes a first lens in the middle and 6*N second lenses around the first lens, where the N is an integer from 1 to 5.

Preferably, the N is 1, and in functional sub-elements at non-edge positions of the functional zone, each of the first lenses is in surface contact with the 6 second lenses.

Preferably, the plurality of the functional sub-elements share at least a part of the second lenses.

Preferably, within a viewable range corresponding to a pupil, a diameter Dr of a diffusion circle formed by the second lens on a retina meets:

$$D_r = \frac{ADD_{22}}{P_{e+1}} \times D_{22}$$

where $ADD_{22}$ is an additional refractive power of the second lens, $D_{22}$ is a diameter of a circumscribed circle of the second lens, $P_{e+1}$ is an overall refractive power of an optical system comprised of a spectacle lens and an eye after wearing the spectacle lens, and Dr is valued from 10 μm to 100 μm. Within the range of the diameter of the pupil, if the number of microlenses is large, the additional refractive power of the microlenses can be set to a smaller value: conversely, if the number of microlenses is small, the additional refractive power of the microlenses can be set to a larger value. For these two forms, the spectacle lens can enable the eyeball to obtain a visual effect that meets the blurring requirements of the image plane.

Preferably, a diameter of a circumscribed circle of the regular polygon is within a range of 0.6 mm to 2.5 mm. The second lens within the size range is less than the pupil in diameter, which can ensure that the vision corresponding to the pupil is subject to the phase modulation of a plurality of second lenses, and thus guarantee that the image blurring effect can be achieved.

Preferably, there is a distance between an outer edge of the functional zone and an outer edge of the spectacle lens, and in a normal direction of a center of the spectacle lens, the outer edge of the functional zone is substantially of a regular polygon or circle. In the direction from the center to the outer edge of the spectacle lens, the spectacle lens consists of an optical zone, a functional zone and an optical zone.

Preferably, the respective first lenses of the functional zone are configured such that the eye can identify the image through the part of first lenses. In fact, the first lenses in the form have a function equivalent to that of the optical zone, which can guarantee that, when the wearer rolls the eyes to correspond to the functional zone, the functional zone can provide a clear image as a basis while the optical zone in the vicinity of the functional zone provides an additional clear image of the surroundings. In the state, the user can basically clearly identify the object image although the second lenses of the functional zone only provide a blurred image plane function.

Preferably, each of the functional sub-elements is configured such that the first lenses are arranged equidistantly in a circumferential direction of the spectacle lens and a radial direction perpendicular to the circumferential direction.

Preferably, the optical zone and the functional zone are formed integrally. For the integrally-formed spectacle lens, the relative positions of the optical zone and the functional zone are precisely controlled during processing. For the spectacle lens formed by pasting, it is difficult to precisely ensure the relative positions of the optical zone and the functional zone.

Preferably, the functional zone is formed on an object side surface of the spectacle lens away from an eyeball, or an eyeball side surface of the spectacle lens close to the eyeball.

In addition, the present disclosure further relates to frame glasses that comprise spectacle lenses according to any one of the contents describe above.

On the basis of conforming to the common knowledge in the art, improved embodiments of the present disclosure can be obtained by arbitrarily combining the preferred implementations as mentioned above.

The spectacle lens and the frame glasses comprising the same according to the present disclosure can ensure a clear vision obtained irrespective of the angle to which the eyes rotate, while guaranteeing that a blurred vision is formed at the periphery, so as to avoid stimulation to the eyeballs. Since the second lenses for providing the blurred image plane are arranged in the fashion of fitting with one other, it is more beneficial to provide the blurred image plane.

BRIEF DESCRIPTION OF THE DRAWINGS

For the sake of better understanding on the above and other objectives, features, advantages, and functions of the present disclosure, the preferred embodiments are provided with reference to the drawings. The same reference symbols refer to the same components throughout the drawings. It is to be understood by those skilled in the art that the drawings are merely provided to illustrate preferred embodiments of the present disclosure, without suggesting any limitation to the protection scope of the present application, and respective components therein are not necessarily drawn to scale.

Figure 1:
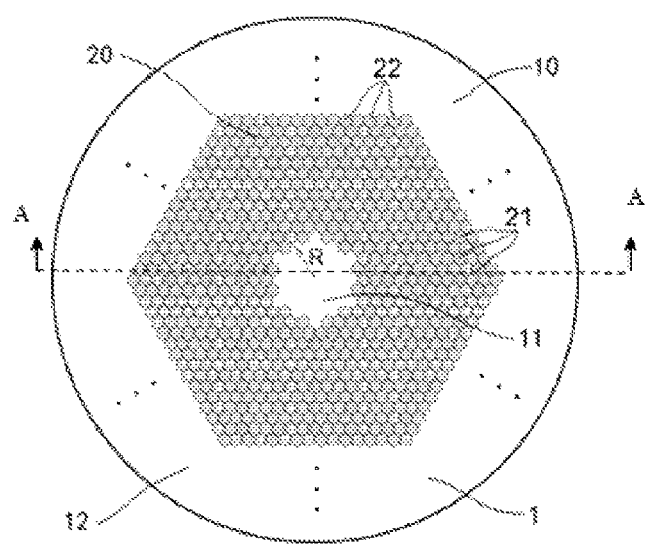
FIG. 1 is a schematic structural diagram of a front surface of a spectacle lens according to a preferred implementation of the present disclosure.

Wherein:
Spectacle lens: 1
Optical zone: 10
Central optical zone: 11
Outer edge optical zone: 12
Functional zone: 20
Functional sub-element: U
First lens: 21
Second lens: 22
Base surface: S

DETAILED DESCRIPTION OF EMBODIMENTS

Reference now will be made to the drawings to describe in detail implementations of the present disclosure. What will be described herein will only cover preferred implementations of the present disclosure, and those skilled in the art would envision other possible manners which also fall into the scope described herein, based on the preferred implementations described herein. In the detailed description below, direction terms, such as "up," "down," "inside," "outside," "longitudinal," "traverse" and the like, are used with reference to the directions described in the drawings. The components in the embodiments of the present disclosure may be positioned in multiple different directions, and the direction terms are employed exemplarily, without limitation.

In the present disclosure, the spectacle lens 1 is adapted to be worn in front of a human eye. The spectacle lens 1 is erected in front of the eye by, for example, a metal frame or plastic frame, rather than contacting the eyeball surface.

Figure 2:
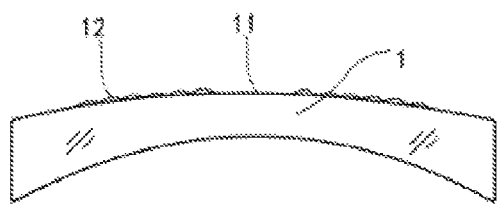
FIG. 2 is a schematic structural diagram of a cross section of a spectacle lens according to a preferred implementation of the present disclosure.

FIG. 1 is a view of a front surface of the spectacle lens 1, which corresponds to a view in front of the center of the spectacle lens 1: FIG. 2 is a view of a cross section of the spectacle lens 1, which corresponds to a view of a section taken along the direction A-A in FIG. 1.

Referring to FIG. 1, in the embodiment, the spectacle lens 1 has a substantially circular surface shape. Alternatively, the spectacle lens 1 may also have a rectangular, spare or other irregular surface shape.

Unless indicated otherwise, "surface shape" used here refers to a shape defined by an outer edge of an object as a whole or a local area of the object, as observed from the normal direction of the object or the local center of the object.

Referring to FIGS. 1-2, the spectacle lens 1 is shown, including an optical zone 10, a functional zone 20, and the like. For differentiation, the functional zone 20 in FIG. 1 is shown in the form of colored blocks. The optical zone 10 can play a corrective role for vision of patients with ametropias. The optical zone 10 of the spectacle glass 1 is optically formed of a material having a refractive index of 1.5 to 1.76 and being suitably used as a spectacle lens. The functional zone 20 is used to form a uniform diffusion circle, enabling a wearer of the spectacle lens 1 to have a blurred peripheral vision image and protecting the eyeball from external stimuli.

The optical zone 10 forms a base surface S of the spectacle lens 1 and has a refractive power based on an eyeball prescription. The optical zone 10 includes a central optical zone 11 located in the central area of the spectacle lens 1. The optical zone 10 for correcting vision has a smooth, continuous surface. The base surface S may be of a rotationally symmetric spherical or aspherical form, or may also be a non-rotationally symmetric cylinder or spherical cylinder. The non-rotationally symmetric cylinder or spherical cylinder may have different curvatures in four quadrants.

The central optical zone 11 of the optical zone 10 is substantially of a circular surface shape, where the radius R of the circle is set to any value within the range from 3 mm to 10 mm, for example, 4 mm, 5 mm, 6 mm, and the like.

In the embodiments of FIGS. 1 and 2, there is a distance between the outer edge of the functional zone 20 and the outer edge of the spectacle lens 1. Specifically, the area between the outer edge of the functional zone 20 and the outer edge of the spectacle lens 1 is also the optical zone 10 (i.e., the edge optical zone 12). As such, in the direction from the center to the outer edge of the spectacle lens 1, the spectacle lens 1 is sequentially provided with the optical zone 10 (the central optical zone 11), the functional zone 20, and the optical zone 10 (the edge optical zone 12).

It is worth noting that, although not shown, the spectacle lens 1 at a part closer to the outer edge or at the outer edge is further provided with mechanisms or features in any form (e.g. a groove, a through hole, a protrusion, and the like) for securing the spectacle lens 1. The mechanisms or features are used for securing a glasses frame and the like, which, however, are not the creative part of the present disclosure. The practicability of the solution of the present disclosure is not affected irrespective of whether those contents are disclosed or not. The details are omitted here.

Continuing to refer to FIG. 1, in the normal direction of the center of the spectacle lens 1, the outer edge of the functional zone 20 may be substantially of a regular hexagon shape. In addition, the functional zone 20 may be substantially of a square, rectangular, circular or other shape. The total area of the coverage of the functional zone 20 on the surface of the spectacle lens 1 can determine the shape defined by the outer edge of the functional zone. In general, in an embodiment with a functional zone 20 having a large coverage, the outer edge of the functional zone 20 may define more types of shapes: in an embodiment with a functional zone 20 having a small coverage, the outer edge of the functional zone 20 is preferably designed in a circular shape, or a shape with a great number of edges (e.g., a hexagon as shown in FIG. 1).

In the present disclosure, "substantially of a regular polygon shape" means that, at the macro level, those skilled in the art can discern that an outer edge of a certain area or part has a regular polygon shape. For the area or part substantially of a regular polygon shape, its edge is not necessarily a rectilinear segment or fringe, but may be a straight-line segment, wavy-line segment, or polyline segment in other forms, instead. On the basis that those skilled in the art can discern the shape defined by the outer edge of the area or part, the area or part is "substantially of a regular polygon shape." For example, in the example of "the outer edge of the functional zone 20 is substantially of a regular hexagon shape" in FIG. 1, although the outer edge of the functional zone 20 are sides in a wavy form, those skilled in the art can still discern that the surface shape of the functional zone 20 defined by the outer edge of the functional zone 20 is of "a regular hexagon shape." In the case, those skilled in the art could fully understand the specific meaning of "substantially" used here.

Figure 3:
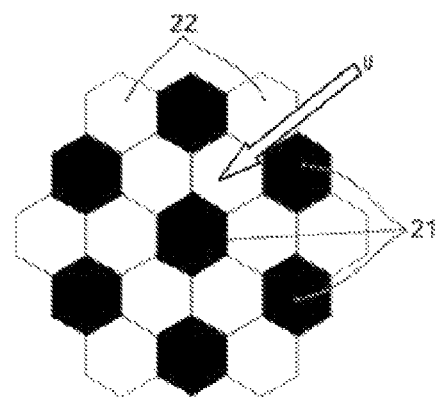
FIG. 3 is a schematic structural diagram of an optical zone of the spectacle lens in FIGS. 1 and 2.

The functional zone 20 is disposed around the central optical zone 11 of the spectacle lens 1, which has an annular structure. The functional zone 20 includes a plurality of functional sub-elements U fitting with one another as shown in FIG. 3. In the embodiment, each functional sub-element U at a non-edge position of the functional zone, it has a first lens 21 in the center position (for differentiation, the first lens 21 in FIG. 3 is shown in back block: however, the whole spectacle lens is transparent or semi-transparent) and 6 second lenses 22 around the first lens 21. The first lens 21 and the second lens 22 have the regular-hexagon surface shape. The first lens 21 and the second lens 22 differ in refractive power. The respective second lenses 22 in the respective functional sub-elements U are in surface contact via surfaces where sides of the regular hexagons are located. Referring to FIGS. 1 and 2, those functional sub-elements U are configured such that wavefronts formed by them can be superimposed on a working focal plane of the optical zone 10 to form a uniform diffusion circle, and the diffusion circle can form a blurred peripheral vision image. The blurred peripheral vision image mentioned here is with respect to the vision image of the central optical zone, and as a preferable solution, the modulation transfer function value of the peripheral imaging field drops below 20% at a spatial frequency of 10 cyc/deg, which is much lower than the modulation transfer function value of the central optical zone (the modulation transfer function value of the central optical zone typically exceeds 70%).

The plurality of functional sub-elements "fitting with another" used here refer to that the functional sub-elements U fit with one another in the circumferential direction and the radial direction of the spectacle lens 1, or the functional sub-elements U have a surface-fitting relationship therebetween in both the circumferential direction and the radial direction.

In the spectacle lens 1 designed in the above-mentioned manner, when the imaging wavefront passes through the functional zone 20, the wavefront will be spatially split according to the distribution of the respective second lenses 22. The formed sub-wavefront will generate a respective phase lag (or advance) as an effect of the additional refractive power of the second lens 22. All the sub-wavefronts are finally superimposed on the working focal plane corresponding to the base surface S within the same area on the retina. The sub-wavefronts will not form a confocal point, thus degrading the image on the retina and avoiding occurrence of a second image plane at the spatial location outside the retina.

As aforementioned, since the respective functional sub-elements U within the functional zone 20 are arranged in the fashion of fitting with one another, and the respective second lenses 22 within the respective functional sub-elements U are arranged in the fashion of fitting with one another, the functional zone 20 for modulation has a great filling rate. In the circumstance, the functional zone 20 can perform deep modulation for the imaging quality of the image plane on the retina to guarantee that a blurred peripheral image can be formed when the eye rotates in any direction, which advantageously prevents an irregular area formed between the functional elements for forming blurred images from generating stimuli to the eyeball. The second lenses 22 (the functional sub-elements U) fitting with one another can cooperate to avoid double images.

For the first lens 21 in the functional sub-element U according to the present disclosure, its refractive power P1 and the refractive power P0 of the optical zone 10 of the respective area are set to meet: P1=P0+ADD, where ADD is an additional refractive power that may be any value from the range of 0 to 0.3D. Preferably, the additional refractive power ADD is set to 0, and the respective first lenses 21 of the functional zone 20 are configured such that the eye can identify an image through the first lenses 21, where the first lenses 21 has a function equivalent to that of the optical zone 10. When the wearer rolls the eyes to rotate the pupil to exactly face the functional zone 20, the second lens 22 and the optical zones 10 in other positions can ensure that the wearer can capture a clear image. In the state, the user can basically clearly identify the object image although the second lenses 22 of the functional zone 20 only provide a blurred image plane function. When the wearer normally looks forward or drastically rolls the eyeballs to a position close to eyelids, both pupils face the optical zone 10, and the wearer can naturally acquire a clear image. In either of the circumstances described above, the second lenses 22 of the functional zone 20 can form an additional peripheral blurred object image.

In the condition of meeting the requirement of providing a peripheral blurred object image, each second lens 22 may be optionally designed as a spherical lens or an aspherical lens. The second lenses 22 of different functional sub-elements U may be set to have the same or different refractive powers, and the phase modulations performed by the respective functional sub-elements U for the respective sub-wavefronts may generate consistent phase delay amounts (phase advance amounts), or may generate inconsistent phase delay amounts (phase advance amounts).

The second lens 22 is a regular lens, and the normal direction of the second lens 22 at its center is generally the same as the normal direction of the base surface S in this position. Although the sub-wavefronts of the second lenses are not confocal with one another, center light of the sub-wavefronts corresponding to the second lenses 22 in the form is all directed towards the same image point position formed by the base curved surface on the retina, ensuring that sub-wavefronts can form a stack at the image point when the sub-wavefronts are propagated to the retina, and the ideal image point is spread into a diffusion circle, thus significantly degrading the imaging quality. This achieves an optimal blur imaging effect.

Figure 4:
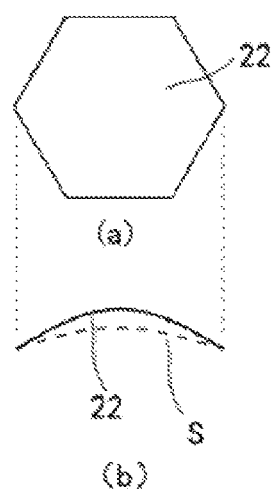
FIG. 4 is a schematic diagram illustrating a front surface and a cross section of a second lens of the spectacle lens.

Referring to the sub-figures (a) and (b) in FIG. 4, the sub-figure (a) corresponds to the front-face direction of the spectacle lens 1 in FIG. 1, and the sub-figure (b) corresponds to the cross-section direction of the spectacle lens 1 in FIG. 2, where the view directions of the sub-figures (a) and (b) are perpendicular to each other. As a preferred embodiment of the present disclosure, referring to the sub-figure (b) of FIG. 4, the 6 apexes of the second lens 22 on the spectacle lens 1 are set on the base surface S (i.e., the arc dashed line in FIG. 4). It is worth noting that the base surface S on which the second lens 22 is located is an imaginary surface (the imaginary surface is occupied by the surface of the second lens 22), and the imaginary surface corresponds to a surface having a specific refractive power set in the position of the spectacle lens 1 according to a prescription requirement. Referring to the sub-figure (a), when 6 apexes are set on the base surface S, the lens is formed in a fashion that the middle part protrudes from the surface of the spectacle lens 1. It would be appreciated that: when processing the spectacle lens 1, the pattern of the base surface S of the lens is automatically generated in the processing equipment program: therefore, when the processing proceeds to the position where the second lens 22 is provided, the positions of apexes of the second lens 22 can be set with reference to the base surface S in this position; and the pattern of the second lens 22 is further processed on the basis. In this process, it is unnecessary to first process the base surface S in the position where the second lens 22 is provided, and then process the second lens. The setting that the apexes of the second lens 22 of the spectacle lens 1 are set on the base surface S can ensure the accuracy of the position of the second lens 22, and the accuracy of the curvature and the refractive power of the second lens 22.

In the embodiment in FIGS. 1-4, the second lens 22 is a convex lens disposed on the object side surface of the spectacle lens away from the eyeball, and there is a distance between the 6 edges of the top surface of the second lens 22 and the base surface S. In a further embodiment not shown, it would be appreciated that 6 apexes of the second lens 22 may be located on the base surface S while the edges of the top surface of the second lens 22 may alternatively be recessed from the base surface S, and at this time, the second lens 22 is in the form of a concave lens.

On one hand, the setting that the apexes of the second lens 22 are set on the base surface S ensures that the second lens 22 does not protrude from or be recessed into the base surface S in a deep distance, to allow the thickness of the spectacle lens 1 to be in a stable range. For the second lens 22 protruding from the base surface S, the lens does not have a great thickness even in the presence of the second lens 22, so it has the characteristics of being light and thin. For the second lens 22 recessed into the base surface S, the small recess depth thereof does not deteriorate the anti-bending and anti-torsion performance at the location of the spectacle lens 1 corresponding to the second lens 22. On the other hand, the setting that the apexes of the second lens 22 are set on the base surface S ensures that a stable reference base may be provided throughout the lens processing process, thus reducing the lens processing complexity.

In the embodiment of FIGS. 1-3, the first lens 21 is in contact with the faces of all the second lenses 22 in the functional sub-element U, and the respective second lenses 22 serves as a common portion of two adjacent functional sub-elements U. For this type of spectacle lens 1, the second lens 22 may be processed preferentially, and when the processing is performed to the position of the first lens 21, it only needs to process the surface of the first lens 21 to a corresponding shape capable of forming the refractive power as required, without processing the surfaces of the first lens 21 facing the respective second lenses 22. Even when the additional refractive power of the first lens 21 is 0, the worker only needs to process the second lens 22. This is obviously beneficial to improve the processing speed and the processing quality:

For the first lens 21 and the second lens 22 having the same regular-hexagon surface shape, the functional sub-element U includes a first lens 21 in the middle and 6*N second lenses 22 around the first lens 21, where N is an integer from 1-5. It would be appreciated that FIG. 3 corresponds to the form of the functional sub-element U with N being equal to 1. When N is set to 2, there are 12 second lenses 22 around the first lens 21, i.e., there are two layers of second lenses 22 outside the first lens 21.

Continuing to refer to FIG. 3, for a plurality of functional sub-elements U, at least a part of the second lenses 22 may be configured as common lenses 22 of adjacent functional sub-elements U. Within the main-body area of the functional zone 20 (i.e., the area not including the inner edge and the outer edge of the functional zone 20), the respective numbers of the first lenses 21 and the second lenses 22 basically meet the following relationship: N2=N1*3, where N1 is the number of the first lenses 21, and N2 is the number of the second lenses 22.

For the second lenses 22 according to the present disclosure, at least 80% of the second lenses 22 are set to have the same shape surface and refractive power. With those designs, the wavefronts generated by the second lenses 22 have a consistent phase lag or advance relative to the wavefronts generated by the first lenses, so that the phase-modulated wavefronts (the wavefronts generated by the second lenses 22) can bring about a uniform optical effect of forming a diffusion circle with a certain size and uniform energy distribution on the retina, rather than a clear point image. Preferably, all the second lenses 22 are set to have the same surface shape and refractive power, which is beneficial to achieve more uniform optical effect.

Although the above description and FIGS. 1-4 only describe the first lens 21 and the second lens 22 having a regular-hexagon surface shape, the surface shape of the second lens 22 may be set in an equilateral triangle, square or other shape according to the invention conception of the present disclosure. Those types of second lenses 22 can all ensure that the spherical or arc-shaped base surfaces S1 of the spectacle lens 1 form the functional zone 20 in the form of surface contacting with one another, and the functional zone 20 forms a first lens 21 uniformly distributed in the circumferential direction and the radial direction, to improve the sharpness of the object image acquired through the glasses when the glasses are facing the functional zone 20. The space (the first lens) separated by the second lenses 22 of the functional sub-elements U has a regular shape having substantially the same distance from the respective edge to the center. This is in particular advantageous for the scenario of eyeing an object through the functional zone.

Accordingly, it would be appreciated that the second lens 22 with a regular-hexagon shape surface is optimal, which ensures that the first lens 21 (having an additional refractive power of 0 or a small refractive power) surrounded by the second lenses 22 is in the form of infinitely closing to a circle, thus guaranteeing to the greatest extent that the first lenses 21 of all the functional zones 20 can form a clear image at the macula.

For the first lens 21 and the second lens 22 according to the present disclosure, the diameter of the circumscribed circle of the regular hexagon is set within the range of 0.6 mm to 2.5 mm. The second lens 22 within the size range is less than the pupil in diameter, which can ensure that the vision corresponding to the pupil is subject to the phase modulation of a plurality of second lenses 22, and thus guarantee that the image blurring effect can be achieved.

Preferably, within the vision corresponding to the pupil, the diameter Dr of diffusion circle formed by those second lenses 22 on the retina meets:

$$D_r = \frac{ADD_{22}}{P_{e+1}} \times D_{22}$$

Wherein, $ADD_{22}$ is the additional refractive power of the second lens, $D_{22}$ is the diameter of the circumscribed circle of the second lens, $P_{e+1}$ is the overall refractive power of the optical system comprised of spectacle lenses and eyes after wearing glasses, and $D_4$ is valued from 10 μm to 100 μm. Within the range of the diameter of the pupil, if there is a great number of second lenses 22, the additional refractive power of the second lens 22 is set to a small value; otherwise, if there is a small number of second lenses 22, the additional refractive power of the second lens 22 is set to a great value. For the two arrangements of second lenses 22, the spectacle lens 1 can enable the eyeball to acquire the visual effect of meeting the image blurring requirement.

Preferably, each functional sub-element U is configured such that the first lenses 21 are arranged equidistantly in a circumferential direction of the spectacle lens and a radial direction perpendicular to the circumferential direction. Here, this is also to ensure that the first lenses 21 can cooperate with other optical zones 10, to guarantee that the wearer is also capable of identifying the object image when the eyeballs are rotating to the functional zone 20.

It is worth noting that, although "the radial direction" is employed above, "the radial direction" is a perpendicular direction relative to the circumferential direction, which is represented as an extending direction from the middle to the outer edge of the spectacle lens 1, not necessarily having the connotation of "the spectacle lens 1 has a circular surface shape." As describe above, the spectacle lens 1 according to the present disclosure may have other non-circular surface shape, such as a rectangular shape and the like.

Preferably, the optical zone 10 and the functional zone 20 are formed integrally. For the integrally-formed spectacle lens 1, the relative positions of the optical zone 10 and the functional zone 20 are precisely controlled during processing. For the spectacle lens 1 formed by pasting, it is difficult to accurately guarantee the relative positions of the optical zone 10 and the functional zone 20.

However, the optical zone 10 and the functional zone 20 formed integrally are not a must. For example, in the embodiment of the second lens 22 in the form of a convex lens as shown in FIG. 1, the functional zone 20 may be secured onto the base surface S by pasting.

In addition, although the functional zone 20 depicted in the embodiment of FIGS. 1-4 is formed on the object side surface of the spectacle lens 1 away from the eyeball, it is only a preferred implementation, and the functional zone 20 may be formed on the eyeball side surface of the spectacle lens 1 close to the eyeball: alternatively, the functional zone 20 can be formed both on the object side surface and on the eyeball side surface of the spectacle lens 1.

The protection scope of the present disclosure is only defined by the appended claims. Given the teaching by the present disclosure, those skilled in the art would easily envision using a substitute of the structure disclosed here as a possible alternative implementation, and combining the implementations disclosed here to form new implementations, where all of them fall into the scope defined by the appended claims.

We claim:

1. A spectacle lens, comprising:
an optical zone forming a base surface of the spectacle lens and having a refractive power according to an eyeball prescription, the optical zone comprising a central optical zone located in a central area of the spectacle lens; and
a functional zone surrounding the central optical zone, the functional zone comprising a plurality of functional sub-elements fitting with one another, each functional sub-element comprising a first lens located in a central position and a plurality of second lenses around the first lens, the first lens and the second lenses having different refractive powers, each of the second lenses having a surface shape of a regular polygon, the respective second lenses of at least part of the plurality of functional sub-elements being in surface contact with one another via a surface where sides of the regular polygons are located, and
the plurality of functional sub-elements are configured such that wavefronts formed thereby can be superimposed on a working focal plane of the optical zone to form a uniform diffusion circle, wherein at least 80% of the second lenses have the same surface shape and refractive power such that wavefronts generated by the part of the second lenses have the same phase advance or phase lag relative to wavefronts generated by the first lenses, and the diffusion circle can form a blurred peripheral vision image.

2. The spectacle lens of claim 1, wherein the second lens is a convex or concave lens disposed on an object side surface of the spectacle lens away from an eyeball, and there is a distance between six edges of a top surface of the second lens and the base surface.

3. The spectacle lens of claim 2, wherein the first lenses of the at least part of the plurality of functional sub-elements are in contact with all the second lenses in the functional sub-elements.

4. The spectacle lens of claim 1, wherein a refractive power P1 of the first lens and a refractive power P0 of the optical zone of a respective area meet the following relationship: P1=P0+ADD, where the ADD is an additional refractive power of the first lens which is any value selected from 0 to 0.3D.

5. The spectacle lens of claim 1, wherein the surface shape of the second lens is any one selected from an equilateral triangle, a square and a regular hexagon.

6. The spectacle lens of claim 5, wherein the central optical zone has a surface shape of a circle, and the circle has a radius r within a range from 3 mm to 10 mm.

7. The spectacle lens of claim 1, wherein the first lens and the second lens have the same regular hexagon surface shape, and the functional sub-element includes a first lens in the middle and 6*N second lenses around the first lens, where the N is an integer from 1 to 5.

8. The spectacle lens of claim 7, wherein the N is 1, and in functional sub-elements at non-edge positions of the functional zone, each of the first lenses is in surface contact with the 6 second lenses respectively.

9. The spectacle lens of claim 7, wherein the plurality of the functional sub-elements share at least a part of the second lenses.

10. The spectacle lens of claim 1, wherein, within a viewable range corresponding to a pupil, a diameter Dr of a diffusion circle formed by the second lens on a retina meets:

$$D_r = \frac{ADD_{22}}{P_{e+1}} \times D_{22}$$

where $ADD_{22}$ is an additional refractive power of the second lens, $D_{22}$ is a diameter of a circumscribed circle of the second lens, $P_{e+1}$ is an overall refractive power of an optical system comprised of a spectacle lens and an eye after wearing the spectacle lens, and Dr is valued from 10 μm to 100 μm.

11. The spectacle lens of claim 10, wherein a diameter of a circumscribed circle of the regular polygon is within a range of 0.6 mm to 2.5 mm.

12. The spectacle lens of claim 1, wherein there is a distance between an outer edge of the functional zone and an outer edge of the spectacle lens, and in a normal direction of an optical center of the central optical zone, the outer edge of the functional zone is of a regular polygon or circle.

13. The spectacle lens of claim 1, wherein each of the first lenses of the functional zone is configured such that an eye can identify an object via those first lenses.

14. The spectacle lens of claim 13, wherein each of the functional sub-elements is configured such that the first lenses are arranged equidistantly in a circumferential direction of the spectacle lens and a radial direction perpendicular to the circumferential direction.

15. The spectacle lens of claim 1, wherein a surface of the spectacle lens is coated with a film, and the film has a hardness higher than that of a base material of the spectacle lens.

16. The spectacle lens of claim 1, wherein the optical zone and the functional zone are formed integrally.

17. The spectacle lens of claim 1, wherein the functional zone is formed on an object side surface of the spectacle lens away from an eyeball, or an eyeball side surface of the spectacle lens close to the eyeball.

18. Frame glasses, wherein the frame glasses comprise spectacle lenses of claim 1.

* * * * *